May 8, 1956  A. ALBERT  2,744,427
PIPE BENDING DEVICE WITH AN ANGULARLY ADJUSTABLE HANDLE
Filed Nov. 27, 1953
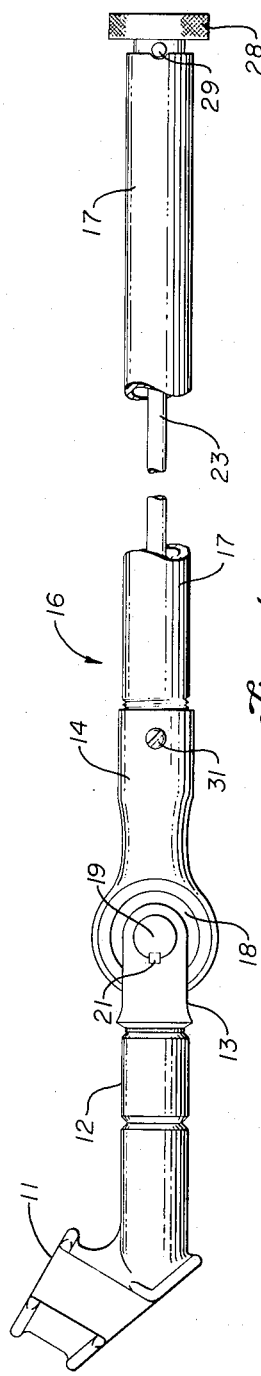
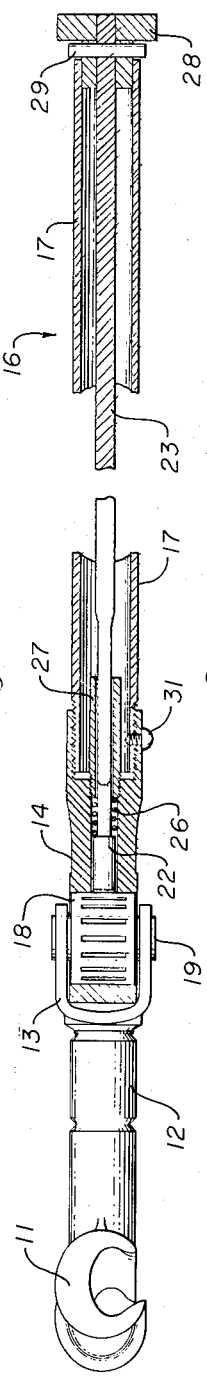
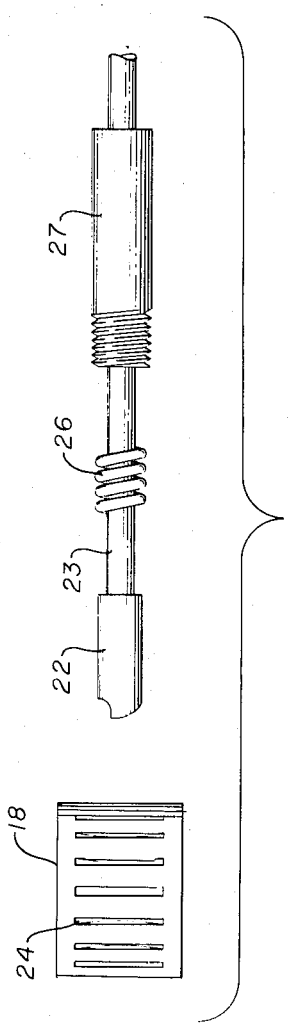
INVENTOR.
ANTHONY ALBERT
BY
ATTORNEYS.

United States Patent Office 2,744,427
Patented May 8, 1956

2,744,427

PIPE BENDING DEVICE WITH AN ANGULARLY ADJUSTABLE HANDLE

Anthony Albert, Hayward, Calif.

Application November 27, 1953, Serial No. 394,637

2 Claims. (Cl. 81—15)

The present invention relates to an improved device for bending pipe, tubing, rod and the like and particularly to a device of this type adapted for desired angular disposition whereby bends may be formed in confined spaces.

Conventional pipe benders, or hickeys as they are commonly termed, are designed to operate upon pipe or the like upon a bench or in an open space and are consequently limited in applicability when employed to form bends in confined spaces such as is required when a pipe in place must be bent in the corner of a room, for example. The present invention includes and employs a conventional hickey which may be adapted to engage pipes or the like of various sizes and further includes an elongated handle providing purchase for operating the hickey and having position control means whereby the handle is readily disposable at any desired angle to the hickey. With this controllable handle positioning the hickey may be employed in any desired location however limited the space and consequently pipe bending operations that were formerly quite difficult if not impossible may be readily accomplished with the present invention.

It is an object of the present invention to provide an improved pipe bending device.

It is another object of the present invention to provide an improved hickey handle having an easily adjustable disposition relative to the hickey.

It is a further object of the present invention to provide handle adjustment means for a hickey whereby the handle is controllably rotatable to a desired degree in any direction relative to the hickey.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing wherein:

Figure 1 is a longitudinal plan view of the hickey and handle with the latter partially broken, as indicated.

Figure 2 is a longitudinal section view of the handle with a hickey coupled thereto.

Figure 3 is a partially exploded view of the handle control mechanism.

Considering now the structural details of the invention and referring to the drawings there is provided a conventional hickey 11 having one or more openings therethrough adapted to receive pipe or the like for bending and having a threaded end adapted to receive a threaded coupling 12 that in turn is threaded to an extension upon a U-shaped yoke 13 having parallel side arms. The yoke 13 extends about a housing 14 that forms one end of a handle 16, the other handle portion including an elongated pipe or tube 17 that may threadably engage the housing 14. A transverse aperture in the housing 14 accommodates a cylindrical ratchet wheel 18 in rotatable relation thereto and an axle 19 is keyed to this wheel 18 by a key 21. The axle 19 extends beyond the housing 14 into aligned openings in the parallel arms of the yoke 13 and is likewise keyed thereto, preferably by the same key 21, so that the yoke, axle, and ratchet wheel rotate together within the housing 14.

The elongated handle portion 17 is hollow and a longitudinal opening is provided in the housing 14 to accommodate the remainder of the ratchet mechanism which includes a cylindrical pawl 22 having a transversely tapered outer end and which is mounted upon a long shaft 23 extending through the entire handle 17. The pawl 22 is disposed adjacent the ratchet wheel 18 and may have on the tapered end thereof a cut-out portion at the outermost end of the taper, as shown in Figure 3, to best fit within longitudinal slots 24 spaced circumferentially about the ratchet wheel. The shaft 23 is movable longitudinally of the axis thereof and thus normal to the axis of the ratchet wheel 18 so that the pawl is movable into and out of engagement with the ratchet wheel. The pawl forceably engages the ratchet wheel under the pressure exerted by a compression spring 26 disposed about the shaft 23 and engaging the back surface of the pawl and either a projection on the housing or a sleeve 27 threaded therein about the shaft 23, as shown in Figure 2. With this structure the pawl is movable into and out of engagement with the ratchet wheel by longitudinal motion of the shaft 23 and while out of engagement with the ratchet wheel may also be rotated by the shaft to reverse the direction of ratchet operation.

Adjustment of the ratchet arrangement is provided by a knob 28 pinned to the end of the shaft 23 as by a pin 29 extending through the knob and shaft and over the edge of the handle tube 17 at the free end thereof. Notches are preferably provided 180 degrees apart on the free end of the handle tube 17 to receive the pin 29 and these notches are aligned so that with the pin therein the pawl on the end of the shaft 23 is aligned with the ratchet wheel to properly engage same. The handle tube 17 and housing 14 may be threaded together and their relative disposition maintained by a bolt or screw 31 threaded through each, as shown in Figure 2.

In operation the handle 16 may be disposed at any desired angle to the hickey 11 so that the bending operation is readily accomplished however cramped the space. Rotation of the handle 16 on the coupling 12 provides one degree of freedom and rotation of the handle 16 on the yoke 13 provides the other degree of freedom. The ratchet is operable in either direction and this is controlled by the setting of the knob 28 at the free end of the handle. To reverse the direction of rotation of the handle on the ratchet it is only necessary to lift the knob 28 so that the pin 29 is raised from the notches and to rotate the pin 180 degrees. Raising the knob draws the pawl away from the ratchet wheel so that the former is free to rotate with the shaft 23, and release of the knob 28 at the 180 degrees point allows the spring 26 to again force the pawl into engagement with the ratchet wheel.

What is claimed is:

1. A pipe bending device comprising a hickey adapted for engagement with pipe and the like to bend same, an axle, a yoke keyed to said axle and connected to said hickey in rotatable relation thereto, a ratchet wheel keyed to said axle, a spring loaded pawl engaging said ratchet wheel and mounted for rotation about an axis normal to that of said ratchet wheel whereby opposite ratchet actions are obtainable, and a handle mounted at one end on said axle about said pawl and restrained thereby whereby said handle is disposable at any desired angle to said hickey.

2. An improved pipe bending device comprising a hickey adapted to engage pipe for bending same, a housing, an axle through said housing, a yoke keyed to said axle for rotation therewith about said housing, a coupling threadably engaging said hickey and yoke for controlled angular disposition thereof, a ratchet wheel keyed to said axle for rotation therewith, a handle secured to said housing and extending therefrom, a shaft extending longitudinally of said handle and mounted for rotation therein, a spring loaded pawl mounted on an end of said shaft adjacent said ratchet wheel for engaging same to limit rotation thereof to a single direction and being rotatable by said shaft for engagement with said ratchet wheel to reverse said direction whereby said handle is disposable at a desired angle to said hickey and rotatable in a single direction with respect thereto from the far end of said handle.

References Cited in the file of this patent

UNITED STATES PATENTS

| | | |
|---|---|---|
| 662,966 | Robertson | Dec. 4, 1900 |
| 780,756 | Lakin | Jan. 24, 1905 |
| 897,055 | Bowers | Aug. 25, 1908 |
| 1,302,197 | Miller et al. | Apr. 29, 1919 |
| 1,821,041 | Turner | Sept. 1, 1931 |
| 2,356,716 | Wheeler | Aug. 22, 1944 |